United States Patent
Ryu et al.

(10) Patent No.: US 9,766,660 B2
(45) Date of Patent: Sep. 19, 2017

(54) FLEXIBLE DISPLAY APPARATUS

(71) Applicant: SAMSUNG DISPLAY CO., LTD., Yongin-si, Gyeonggi-do (KR)

(72) Inventors: Ji-hun Ryu, Suwon-si (KR); Sangjo Lee, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 14/973,647

(22) Filed: Dec. 17, 2015

(65) Prior Publication Data

US 2016/0209879 A1 Jul. 21, 2016

(30) Foreign Application Priority Data

Jan. 15, 2015 (KR) .................. 10-2015-0007606

(51) Int. Cl.
*G06F 1/16* (2006.01)

(52) U.S. Cl.
CPC .......... *G06F 1/1652* (2013.01); *G06F 1/1601* (2013.01); *G06F 2200/1612* (2013.01)

(58) Field of Classification Search
CPC .................................................. G06F 1/1652
USPC ....... 361/679.01–679.3, 679.55–679.59, 749
See application file for complete search history.

(56) References Cited

U.S. PATENT DOCUMENTS

| | | | | |
|---|---|---|---|---|
| 6,593,906 B2 * | 7/2003 | Haba | .................. | G09F 11/29 345/108 |
| 9,007,350 B2 * | 4/2015 | Burgin | .................. | G09F 9/30 345/205 |
| 2002/0070910 A1 * | 6/2002 | Fujieda | .................. | G06F 1/1615 345/85 |
| 2006/0192726 A1 * | 8/2006 | Huitema | .................. | G06F 1/1601 345/1.1 |
| 2007/0146243 A1 * | 6/2007 | Ou Yang | .................. | G06F 1/1601 345/76 |
| 2008/0247126 A1 * | 10/2008 | Otsuka | .................. | G06F 1/1601 361/679.06 |
| 2010/0201261 A1 | 8/2010 | Kwack et al. | | |
| 2012/0120480 A1 * | 5/2012 | Van Lieshout | ... | G02F 1/133305 359/296 |

(Continued)

FOREIGN PATENT DOCUMENTS

| | | | |
|---|---|---|---|
| JP | 9-160506 A | | 6/1997 |
| JP | 09160506 A | * | 6/1997 |
| KR | 10-1417184 B1 | | 7/2014 |

OTHER PUBLICATIONS

Korean Patent Abstract for KR 10-2010-0016501 A, which corresponds to KR Publication No. 10-1417184 B1, published Jul. 8, 2014, 1 page.

*Primary Examiner* — Nidhi Thaker
(74) *Attorney, Agent, or Firm* — Lewis Roca Rothgerber Christie LLP (57) ABSTRACT

A flexible display apparatuses includes a flexible display module configured to extend in a first direction, and including a front surface configured to display an image, and a rear surface opposite the front surface, a housing configured to house the flexible display module, a first roller inside the housing and configured to contact the front surface of the flexible display module to bend the front surface inward, and a second roller spaced from the first roller in the housing and configured to contact the rear surface of the flexible display module to bend the rear surface inward.

15 Claims, 5 Drawing Sheets

(56) References Cited

U.S. PATENT DOCUMENTS

| | | | |
|---|---|---|---|
| 2013/0058063 A1 | 3/2013 | O'Brien | |
| 2016/0034000 A1* | 2/2016 | Lee | G06F 1/1652 |
| | | | 361/749 |
| 2016/0120022 A1* | 4/2016 | Lee | G06F 1/1652 |
| | | | 361/749 |
| 2016/0135284 A1* | 5/2016 | Choi | G09F 9/301 |
| | | | 361/749 |
| 2016/0165717 A1* | 6/2016 | Lee | G06F 1/16 |
| | | | 361/749 |

* cited by examiner

FLEXIBLE DISPLAY APPARATUS

CROSS-REFERENCE TO RELATED APPLICATION

This patent application claims priority to, and the benefit of, Korean Patent Application No. 10-2015-0007606, filed on Jan. 15, 2015, the entire contents of which are hereby incorporated by reference.

BACKGROUND

The present disclosure herein relates to a flexible display apparatus, and more particularly, to a flexible display apparatus with improved display quality.

Development of a flexible display device is ongoing according to increasing market demand. The general flexible display device may include a curved display device that is fixed with a specific curvature, a rollable display device that is rollable with a specific radius of curvature, and a foldable display device that may be bent with a given radius of curvature or more, or that may be folded with respect to a folding axis. Among them, the rollable display device has aspects including wide display area and excellent portability. Accordingly, research and development regarding the rollable display device have been progressing.

SUMMARY

The present disclosure provides a flexible display apparatus that is able to prevent or reduce deformation of a flexible display module when the flexible display module is stored in a housing.

An embodiment of the present invention provides a flexible display apparatus including a flexible display module configured to extend in a first direction, and including a front surface configured to display an image, and a rear surface opposite the front surface, a housing configured to house the flexible display module, a first roller inside the housing and configured to contact the front surface of the flexible display module to bend the front surface inward, and a second roller spaced from the first roller in the housing and configured to contact the rear surface of the flexible display module to bend the rear surface inward.

Each of the first and second rollers may have a cylindrical shape and may extend in a second direction that is perpendicular to the first direction.

The flexible display module may have a first thickness, and a distance between the first roller and the second roller may be greater than or equal to the first thickness.

A length of the flexible display module in an unrolled state in the first direction may be less than a sum of circumferences of the first and second rollers.

When the flexible display module is inserted into the housing, the first roller may be configured to rotate in a clockwise direction, and the second roller may be configured to rotate in a counterclockwise direction.

When the flexible display module is drawn from the housing, the first roller may be configured to rotate in a counterclockwise direction, and the second roller may be configured to rotate in a clockwise direction.

Rotational axes of the first and second rollers may be in a same plane.

The flexible display apparatus may further include a third roller parallel to the first roller and the second roller, the second roller being between the third roller and the first roller, and the third roller being configured to contact the front surface of the flexible display module to bend the front surface inward.

In another embodiment, a flexible display apparatuses includes a flexible display module including a front surface configured to display an image, and a rear surface opposite the front surface, first type rollers configured to contact the front surface of the flexible display module to bend the front surface inward, and second type rollers alternately arranged with the first type rollers, and configured to contact the rear surface of the flexible display module to bend the rear surface inward.

The flexible display apparatus may further include a housing for accommodating the first and second type rollers, and the flexible display module may be configured to be inserted into, or drawn from, the housing.

When the flexible display module is inserted into the housing, the first type rollers may rotate in a first direction, and the second type rollers may rotate in a second direction that is opposite the first direction.

When the flexible display module is drawn from the housing, the second type rollers may rotate in a first direction, and the first type rollers may rotate in a second direction that is opposite the first direction.

Rotational axes of adjacent ones of the first and second type rollers may be in a same plane.

The adjacent ones of the first and second type rollers may be separated by a distance that is greater than or equal to a thickness of the flexible display module.

The first type rollers and the second type rollers may be collectively arranged in a loop shape.

BRIEF DESCRIPTION OF THE DRAWINGS

The accompanying drawings are included to provide a further understanding of the described embodiments, and are incorporated in and constitute a part of this specification. The drawings illustrate exemplary embodiments and, together with the description, serve to explain aspects and features of the present invention. In the drawings.

DETAILED DESCRIPTION

Features of the inventive concept and methods of accomplishing the same may be understood more readily by reference to the following detailed description of embodiments and the accompanying drawings. The inventive concept may, however, be embodied in many different forms and should not be construed as being limited to the embodiments set forth herein. Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Hereinafter, exemplary embodiments will be described in detail with reference to the accompanying drawings.

Figure 1:
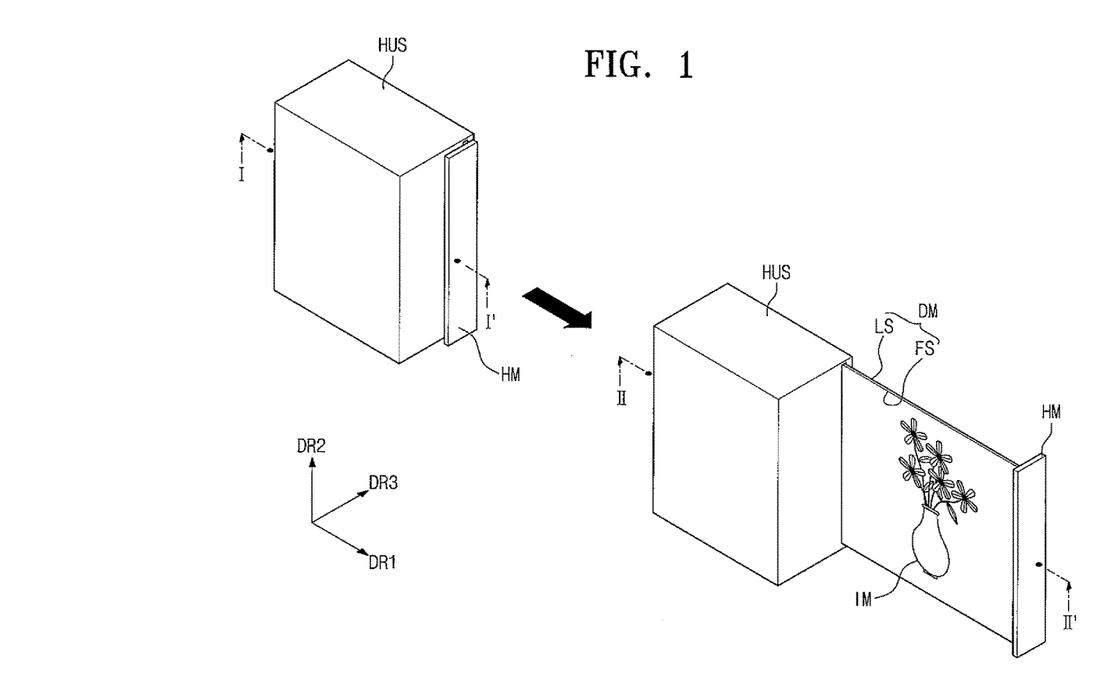
FIG. 1 is a perspective view of a flexible display apparatus according to an embodiment.
Figure 2A:
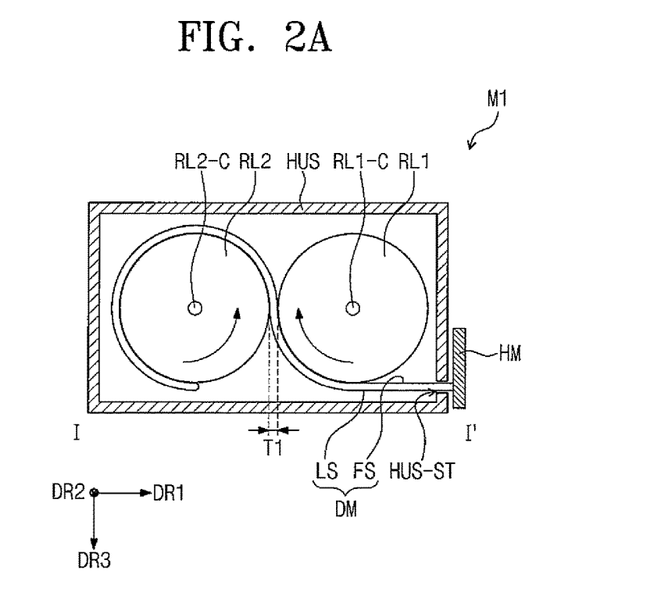
FIG. 2A is a cross-sectional view of a flexible display apparatus taken along the line I-I' of FIG. 1.
Figure 2B:
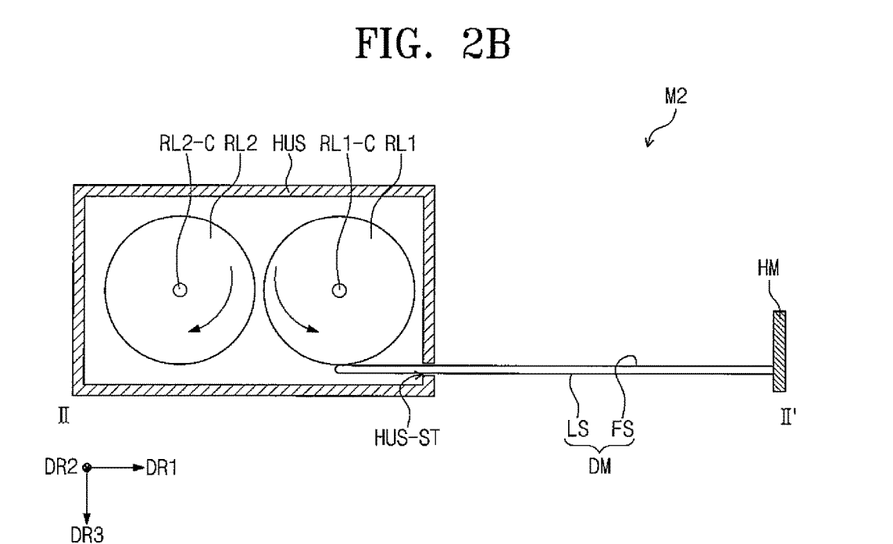
FIG. 2B is a cross-sectional view of a flexible display apparatus taken along the line II-II' of FIG. 1.

FIG. 1 is a perspective view of a flexible display apparatus according to an embodiment, FIG. 2A is a cross-sectional view of a flexible display apparatus taken along the line I-I' in FIG. 1, and FIG. 2B is a cross-sectional view of a flexible display apparatus taken along the line II-II' in FIG. 1.

As illustrated in FIGS. 1 and 2B, a flexible display apparatus according to the present embodiment includes a flexible display module DM, a housing HUS, and rollers (e.g., RL1 and RL2).

The flexible display module DM is configured to display an image IM. A first direction DR1 and a second direction DR2, which are orthogonal to each other, define a plane that is parallel to a display surface of the flexible display module DM when extended, and a third direction DR3 indicates a direction of the thickness of the flexible display module DM.

A front surface FS and a rear surface LS of the flexible display module DM are opposite to each other with respect to the third direction DR3. The front surface FS of the flexible display module DM, on which the image IM may be displayed, is defined as the display surface.

A plurality of pixels, each pixel being an individual unit used to form the image IM, may be located at the display surface of the flexible display module DM. Each of the pixels may include at least one thin film transistor.

Further, the flexible display module DM may include a window member, a display panel, and a touch panel, and may also include an optical member, such as a phase retardation plate and/or a polarizing plate.

The flexible display module DM is configured to display the image IM when in an unrolled state. The flexible display module DM may also partially or gradually display the image IM while being unrolled. Hereinafter, a first mode M1 represents a state in which the flexible display module DM is rolled, and a second mode M2 represents a state in which the flexible display module DM is unrolled.

The flexible display apparatus further includes a holding member HM coupled to the flexible display module DM that may be held by a user to allow the flexible display module DM to be unrolled. The holding member HM may contact and may be fixed to an end of the flexible display module DM.

In another embodiment, the flexible display apparatus may further include a driving part (e.g., a motor) for rotating the rollers. In the embodiment where the rollers are rotated by a motor, the holding member HM may be omitted.

As illustrated in FIGS. 2A and 2B, the housing HUS may accommodate the flexible display module DM and the rollers (e.g., RL1 and RL2).

The housing HUS includes a slit HUS-ST through which the flexible display module DM passes to be either stored in the housing HUS or exposed to the outside. The flexible display module DM may be drawn from, or inserted into, the housing by moving in the first direction DR1 through the slit HUS-ST.

The rollers are located inside the housing HUS, and may be rotatably fixed inside the housing HUS. The rollers may include a first roller RL1 and a second roller RL2. Although it is illustrated that two rollers are located in the present embodiment, other embodiments of the present invention are not limited thereto. For example, at least two or more rollers may be provided.

The first roller RL1 and the second roller RL2 may be spaced from each other with respect to the first direction DR1. The first roller RL1 and the second roller RL2 may be spaced from each other by at least a thickness (hereinafter, referred to as a first thickness T1) of the flexible display module DM. In the present embodiment, although the first roller RL1 and the second roller RL2 are spaced about a distance equal to the first thickness T1 from each other, other embodiments of the present invention are not limited thereto. For example, the first roller RL1 and the second roller RL2 may be spaced from each other a distance that is greater than the first thickness T1.

The first roller RL1 and the second roller RL2 may extend along the second direction DR2. The first roller RL1 and the second roller RL2 may have a cylindrical shape extending along the second direction DR2. A first rotational axis RL1-C of the first roller RL1 and a second rotational axis RL2-C of the second roller RL2 may be located on the same plane (e.g., a plane defined by the first direction DR1 and the second direction DR2).

The first roller RL1 may contact the front surface FS of the flexible display module DM, and may be configured to bend the front surface FS (e.g., to bend the front surface FS inward, in a concave manner, toward itself). The second roller RL2 may be configured to contact the rear surface LS of the flexible display module DM, and may be configured bend the rear surface LS (e.g., to bend the rear surface LS inward toward itself, and to bend the front surface FS outward, in a convex manner).

As illustrated in FIG. 2A, in the first mode M1, as the first roller RL1 rotates in a clockwise direction, and as the second roller RL2 rotates in a counterclockwise direction, the flexible display module DM is wound around the first roller RL1 and the second roller RL2.

In other embodiments, a portion of the second roller RL2, and an end the flexible display module DM that is housed in the housing HUS, may each further include members having magnetic force. Accordingly, when the flexible display module DM is located between the first roller RL1 and the second roller RL2 in the first mode M1, the other end of flexible display module DM may be magnetically coupled to the second roller RL2 to wind the flexible display module DM around the second roller RL2.

In the present embodiment, the sum of the circumferences of the first roller RL1 and the second roller RL2 is greater than a length of the flexible display module DM with respect to the first direction DR1. In the first mode M1, the flexible display module DM may contact a majority of the second roller RL2 to be wound around the second roller RL2. The member having magnetic force, which is included in at least a portion of the second roller RL2, may be adjusted or controlled to have magnetic force in the first mode M1.

Referring to FIG. 2B, in the second mode, as the first roller RL1 rotates in a counterclockwise direction, and as the second roller RL2 rotates in a clockwise direction, the flexible display module DM is unrolled from the first roller RL1 and the second roller RL2. Here, the end of the flexible display module DM housed in the housing HUS may be fixed to at least a portion of the first roller RL1.

In other embodiments, the end of the flexible display module DM housed in the housing HUS, and a portion of the first roller RL1, may further include other members having magnetic force. Accordingly, in the second mode M2, the end of the flexible display module DM may be fixed (e.g., magnetically fixed) to at least a portion of the first roller RL1 to prevent the flexible display module DM from being separated from the housing HUS. The member having magnetic force that is included in at least a portion of the first roller RL1 may be adjusted to have magnetic force in the second mode M2.

The flexible display apparatus according to other embodiments may further include a structure for coupling the flexible display module DM with the rollers. Also, a communication module, a control module, or the like may be further located inside the housing HUS in such a shape that it is mounted on a circuit board.

In a housing having a single roller, wherein the flexible display module DM is wound in only one direction to be stored, the flexible display module DM may be continuously stressed in one direction. Accordingly, the flexible display module DM may be deformed when the flexible display module DM is stored in the housing HUS for a long time.

According to the present embodiment, however, the flexible display module DM may have the front surface FS bent by the first roller RL1, and may have the rear surface LS bent in an opposite direction by the second roller RL2, causing the flexible display module DM to thereby be stored in a shape of a wave. That is, because bending stress is applied to both surfaces of the flexible display module DM (e.g., in opposite directions), the bending stress applied to one surface of the flexible display module DM may be reduced or relieved. Accordingly, a deformation defect that may occur when the flexible display module DM is rolled in only one direction may be reduced, even when the flexible display module DM is stored inside the housing HUS for a long time.

In the flexible display apparatus according to an embodiment, the number of the rollers may be changed according to a total length of the unrolled flexible display module DM extending in the first direction DR1. That is, fewer rollers may be used when the length of the flexible display module DM is smaller, and a greater number of rollers may be used when the length of the flexible display module DM is longer. Also, a size of the diameter of the rollers may depend on the length of the flexible display module DM.

Figure 3:
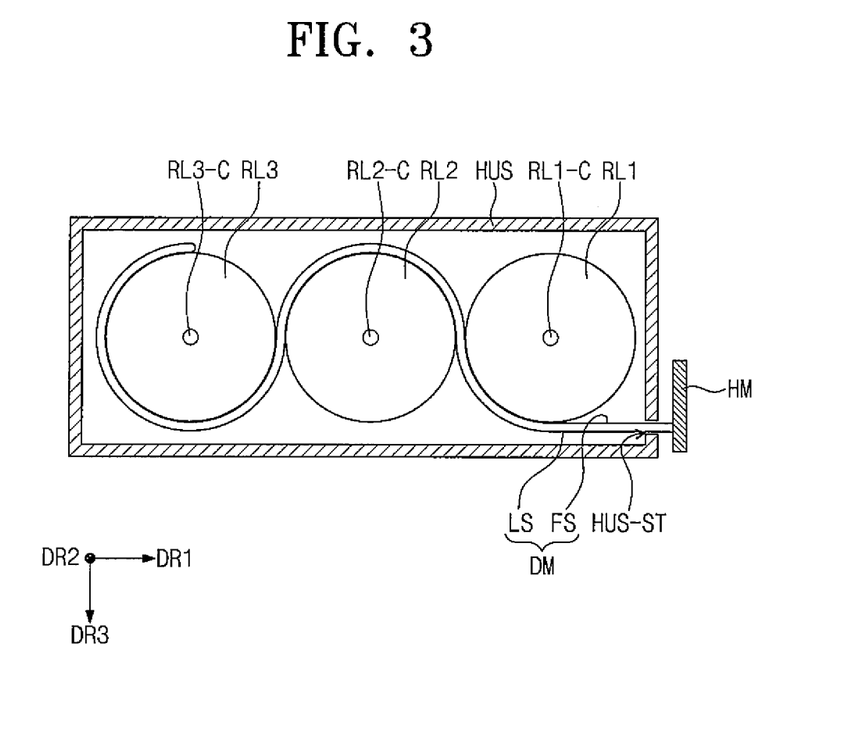
FIG. 3 is a cross-sectional view of a flexible display apparatus according to another embodiment.

FIG. 3 is a cross-sectional view of a flexible display apparatus according to another embodiment. Hereinafter, description already given with respect to the previous embodiment will not be provided herein for convenience in description.

As illustrated in FIG. 3, the flexible display apparatus according to another embodiment may further include a third roller RL3 in addition to the first and second rollers RL1 and RL2 of the previous embodiment.

The first to third rollers RL1 to RL3 may be arranged such that they are spaced a constant distance from each other in the first direction DR1. Although the first to third rollers RL1 to RL3 of the present embodiment are spaced apart from each other in the first direction DR1, the present invention is not limited thereto. For example, the first to third rollers RL1 to RL3 may be spaced from each other in the third direction DR3, which is perpendicular to the first direction DR1.

Each of the first to third rollers RL1 to RL3 may be spaced from each other by a distance that is greater than or substantially equal to a thickness of the flexible display module DM. In another embodiment, although the first and third rollers RL1 and RL3 are each spaced from the second roller RL2 by about a distance that is equal to the thickness of the flexible display module DM, the present invention is not limited thereto. The first to third rollers RL1 to RL3 may be spaced from respective ones of each other by about a distance that is greater than the thickness of the flexible display module DM. Rotational axes RL1-C to RL3-C of the first to third rollers RL1 to RL3 may be located on the same plane.

The first roller RL1 may be configured to contact the front surface FS of the flexible display module DM and to bend the front surface FS. The second roller RL2 may be configured to contact the rear surface LS of the flexible display module DM and to bend the rear surface LS. The third roller RL3 may be configured to contact the front surface FS of the flexible display module DM and to bend the front surface FS.

In the first mode M1, as the first roller RL1 and the third roller RL3 rotate in a clockwise direction, and as the second roller RL2 rotates in a counterclockwise direction, the flexible display module DM is wound around the first to third rollers RL1 to RL3.

The sum of circumferences of the first to third rollers RL1 to RL3 is greater than a length of the unrolled flexible display module DM in the first direction DR1. Accordingly, in the first mode M1, the flexible display module DM may contact a majority of the third roller RL3 to be wound around the third roller RL3.

In the second mode M2, as the first roller RL1 and the third roller RL3 rotate in the counterclockwise direction, and as the second roller RL2 rotates in the clockwise direction, the flexible display module DM is unrolled from the first to third rollers RL1 to RL3.

Figure 4A:
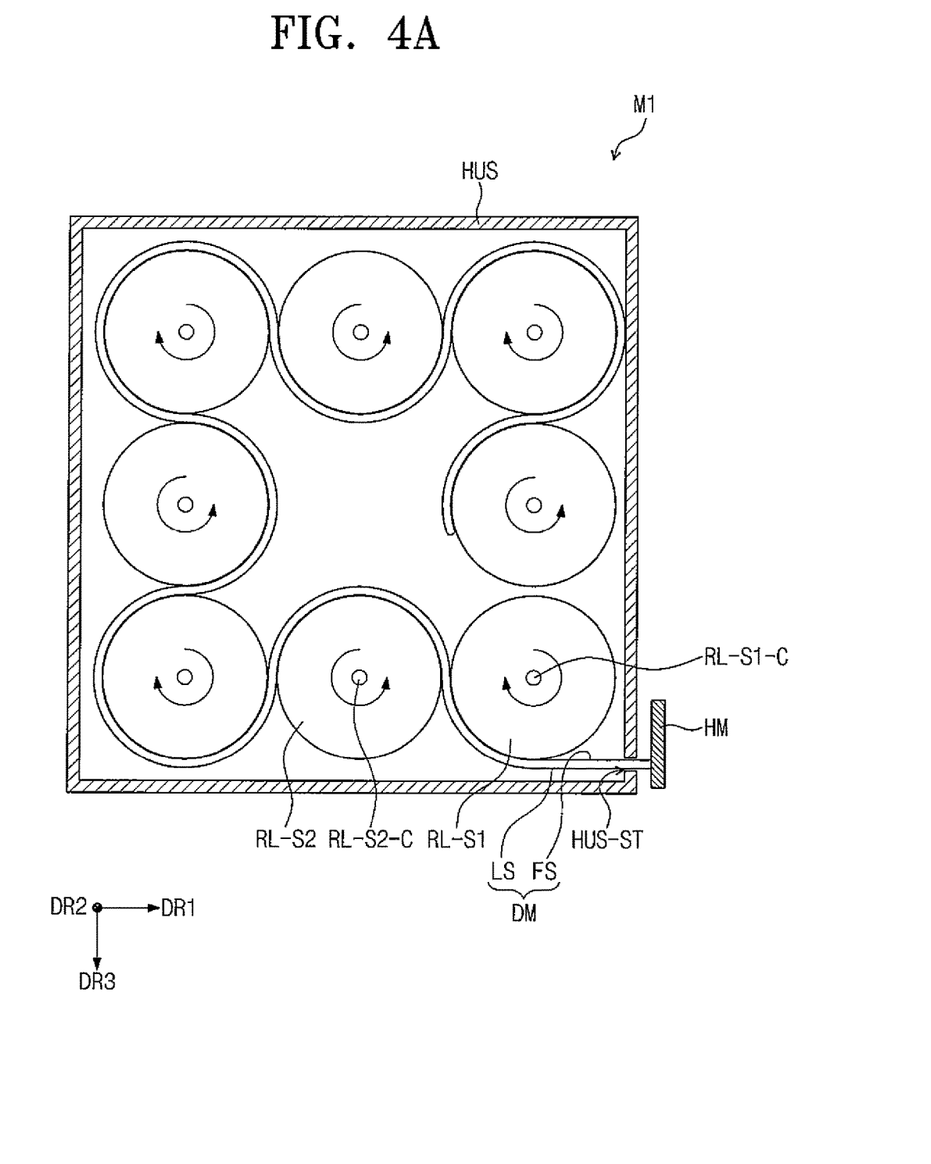
FIGS. 4A and 4B are cross-sectional views of a flexible display apparatus according to another embodiment.
Figure 4B:
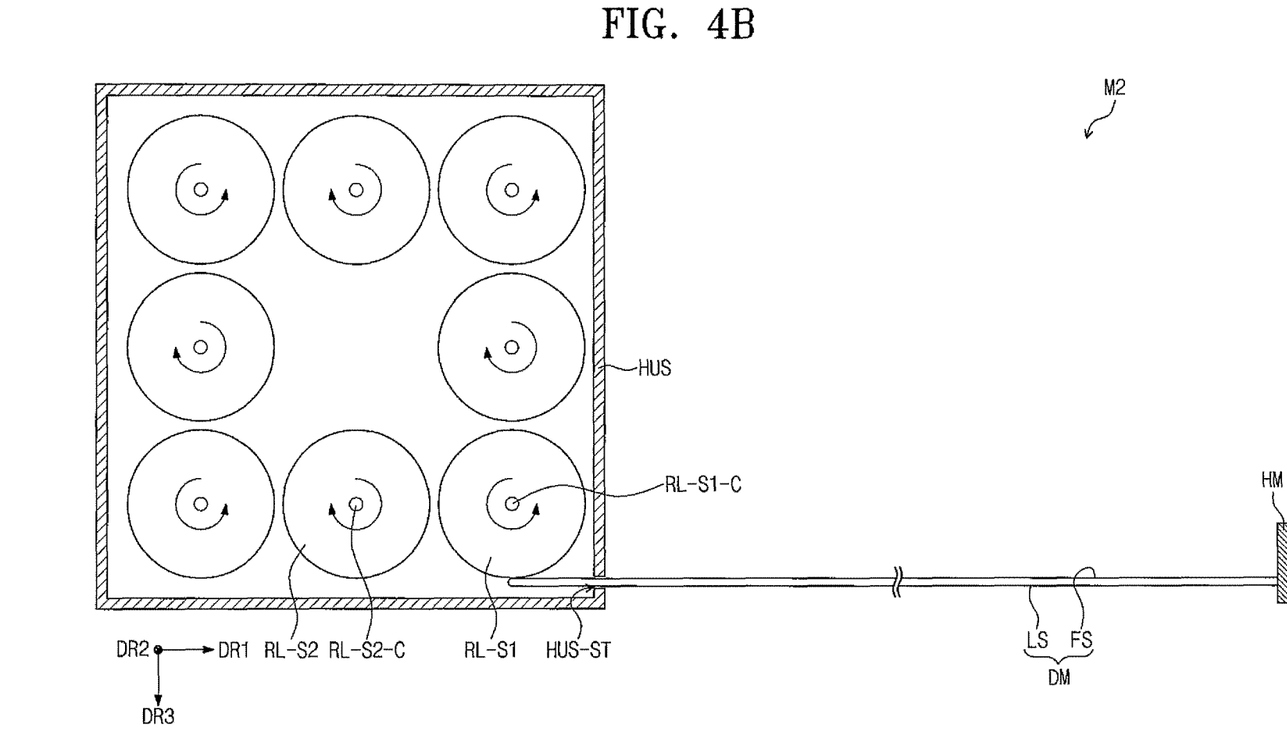

FIGS. 4A and 4B are cross-sectional views of a flexible display apparatus according to another embodiment. Hereinafter, description already given with respect to the previously described embodiments will not be repeated, for convenience in description.

As illustrated in FIGS. 4A and 4B, the flexible display apparatus according to another embodiment includes a flexible display module DM, a housing HUS, and rollers. The rollers may include first type rollers RL-S1 and second type rollers RL-S2. The first type rollers RL-S1 and the second type rollers RL-S2 are alternately arranged in the housing HUS and respectively spaced apart from each other.

Two adjacent rollers among the first type rollers RL-S1 and the second type rollers RL-S2 may be spaced from each other by a distance that is greater than or substantially equal to a thickness of the flexible display module DM. In another embodiment, although it is illustrated that two adjacent rollers among the first type rollers RL-S1 and the second type rollers RL-S2 are spaced from each other by about a distance that is equal to the thickness of the flexible display module DM, the present disclosure is not limited thereto. Adjacent ones of the rollers may be spaced from each other by a distance that is greater than the thickness of the flexible display module DM.

The rotational axes RL-S1-C and RL-S2-C of the two adjacent rollers among the first type rollers RL-S1 and the second type rollers RL-S2 may be located at a same plane.

The first type rollers RL-S1 may be configured to contact and bend the front surface FS of the flexible display module DM. The second type rollers RL-S2 may be configured to contact and bend the rear surface LS of the flexible display module DM.

The first type rollers RL-S1 and the second type rollers RL-S2 may be located in a loop shape. Although it is illustrated in the present embodiment that four first type rollers RL-S1 and four second type rollers RL-S2 are in a rectangular loop shape along an inner shape of the housing HUS, other embodiments of the present invention are not limited thereto. For example, the first type rollers RL-S1 and the second type rollers RL-S2 may be arranged in the housing HUS to have a polygonal loop shape or a circular loop shape (e.g., the rotational axes of the first type rollers RL-S1 and the second type rollers RL-S2 may be positioned to be in a circle).

The housing HUS of the present embodiment, where the first type rollers RL-S1 and the second type rollers RL-S2 are located in a loop shape, may have a size that is less than that of the housing HUS of the embodiment having the first type rollers RL-S1 and the second type rollers RL-S2 are arranged in a row, in one direction.

When the first type rollers RL-S1 and the second type rollers RL-S2 are located in a loop shape, the number of the first type rollers RL-S1 and the number of the second type rollers RL-S2 may be an even number.

As illustrated in FIG. 4A, in the first mode M1, as the first type rollers RL-S1 rotate in the clockwise direction, and as the second type rollers RL-S2 rotate in the counterclockwise direction, the flexible display module DM is wound around the first and second type rollers RL-S1 and RL-S2. Although it is illustrated herein that the first type rollers RL-S1 rotate in the clockwise direction and that the second type rollers RL-S2 rotate in the counterclockwise direction, the present disclosure is not limited thereto. For example, when the first type rollers RL-S1 rotate in a counterclockwise direction, the second type rollers RL-S2 may rotate in the clockwise direction.

The sum of circumferences of the first type rollers RL-S1 and the second type rollers RL-S2 is greater than a total length of the unrolled flexible display module DM extending in the first direction DR1.

As illustrated in FIG. 4A, in the second mode M2, as the first type rollers RL-S1 rotate in the counterclockwise direction, and as the second type rollers RL-S2 rotate in the clockwise direction, the flexible display module DM is unrolled from the first type rollers RL-S1 and the second type rollers RL-S2. Although it is illustrated herein that the first type rollers RL-S1 rotate in the counterclockwise direction, and that the second type rollers RL-S2 rotate in the clockwise direction, the present invention is not limited thereto. For example, in other embodiments, the flexible display module may be unrolled by rotating the first type rollers RL-S1 in the clockwise direction, and by rotating the second type rollers RL-S2 in the counterclockwise direction.

According to the embodiments described above, a flexible display apparatus may reduce or prevent deformation of a flexible display module while the flexible display module is stored in a housing for an extended period of time.

Although exemplary embodiments have been disclosed, various changes and modifications may be made thereto by one skilled in the art without departing from the scope and spirit of the invention as set forth in the appended claims.

Therefore, the detailed description does not intend to limit the present disclosure to the disclosed embodiments. Further, the scope of the present invention should be defined by the following claims, and their equivalents.

What is claimed is:

1. A flexible display apparatus, comprising:
   a flexible display module configured to extend in a first direction, and comprising a front surface configured to display an image, and a rear surface opposite the front surface;
   a housing configured to house the flexible display module;
   a first roller inside the housing and configured to contact the front surface of the flexible display module to bend the front surface inward; and
   a second roller spaced from the first roller at a fixed distance in the housing and configured to contact the rear surface of the flexible display module to bend the rear surface inward,
   wherein the first and second rollers are configured to rotate in opposite directions when the flexible display module is either inserted into the housing or drawn from the housing.

2. The flexible display apparatus of claim 1, wherein each of the first and second rollers has a cylindrical shape and extends in a second direction that is perpendicular to the first direction.

3. The flexible display apparatus of claim 2, wherein the flexible display module has a first thickness, and
   wherein a distance between the first roller and the second roller is greater than or equal to the first thickness.

4. The flexible display apparatus of claim 3, wherein a length of the flexible display module in an unrolled state in the first direction is less than a sum of circumferences of the first and second rollers.

5. The flexible display apparatus of claim 4, wherein, when the flexible display module is inserted into the housing, the first roller is configured to rotate in a clockwise direction, and the second roller is configured to rotate in a counterclockwise direction.

6. The flexible display apparatus of claim 5, wherein, when the flexible display module is drawn from the housing, the first roller is configured to rotate in a counterclockwise direction, and the second roller is configured to rotate in a clockwise direction.

7. The flexible display apparatus of claim 6, wherein rotational axes of the first and second rollers are in a same plane.

8. A flexible display apparatus, comprising:
   a flexible display module configured to extend in a first direction, and comprising a front surface configured to display an image, and a rear surface opposite the front surface;
   a housing configured to house the flexible display module;
   a first roller inside the housing and configured to contact the front surface of the flexible display module to bend the front surface inward;
   a second roller spaced from the first roller in the housing and configured to contact the rear surface of the flexible display module to bend the rear surface inward; and
   a third roller parallel to the first roller and the second roller, the second roller being between the third roller and the first roller, and the third roller being configured to contact the front surface of the flexible display module to bend the front surface inward.

9. A flexible display apparatus, comprising:
   a flexible display module comprising a front surface configured to display an image, and a rear surface opposite the front surface;
   first type rollers configured to contact the front surface of the flexible display module to bend the front surface inward; and
   second type rollers alternately arranged with the first type rollers, and configured to contact the rear surface of the flexible display module to bend the rear surface inward.

10. The flexible display apparatus of claim 9, further comprising a housing for accommodating the first and second type rollers,
    wherein the flexible display module is configured to be inserted into, or drawn from, the housing.

11. The flexible display apparatus of claim 10, wherein, when the flexible display module is inserted into the housing, the first type rollers rotate in a first direction, and the second type rollers rotate in a second direction that is opposite the first direction.

12. The flexible display apparatus of claim 10, wherein, when the flexible display module is drawn from the housing, the second type rollers rotate in a first direction, and the first type rollers rotate in a second direction that is opposite the first direction.

13. The flexible display apparatus of claim 10, wherein rotational axes of adjacent ones of the first and second type rollers are in a same plane.

14. The flexible display apparatus of claim 13, wherein the adjacent ones of the first and second type rollers are separated by a distance that is greater than or equal to a thickness of the flexible display module.

15. The flexible display apparatus of claim 10, wherein the first type rollers and the second type rollers are collectively arranged in a loop shape.

* * * * *